United States Patent [19]
Berger et al.

[11] 3,810,477
[45] *May 14, 1974

[54] TOBACCO SMOKE FILTER

[75] Inventors: Richard M. Berger, Richmond;
Elwin W. Brooks, Mechanicsville,
both of Va.

[73] Assignee: American Filtrona Corporation,
Richmond, Va.

[ * ] Notice: The portion of the term of this patent subsequent to Oct. 13, 1987 has been disclaimed.

[22] Filed: Apr. 5, 1973

[21] Appl. No.: 348,073

Related U.S. Application Data

[60] Division of Ser. No. 261,835, June 12, 1972, which is a continuation-in-part of Ser. No. 155,705, June 23, 1971, which is a division of Ser. No. 45,109, June 10, 1970, Pat. No. 3,637,447, which is a continuation-in-part of Ser. No. 820,355, April 30, 1969, Pat. No. 3,599,646, which is a continuation-in-part of Ser. No. 727,477, May 8, 1969, Pat. No. 3,533,416.

[52] U.S. Cl. ............................ 131/261 R, 131/10.5
[51] Int. Cl. ............................ A24d 1/64, A24f 7/64
[58] Field of Search .... 131/10.5, 10 R, 10.7, 261 B, 131/261 R

[56] References Cited
UNITED STATES PATENTS

| | | | |
|---|---|---|---|
| 3,533,416 | 3/1972 | Berger et al. | 131/10.5 X |
| 3,599,646 | 8/1971 | Berger et al. | 131/10.5 X |
| 3,648,711 | 10/1970 | Berger et al. | 131/10.5 X |

*Primary Examiner*—Wm. H. Grieb
*Assistant Examiner*—John F. Pitrelli
*Attorney, Agent, or Firm*—Holman & Stern

[57] ABSTRACT

Tobacco smoke filter means, particularly for use with cigarettes and the like, having improved filtration efficiencies and/or reduced costs. One embodiment increases filtration efficiency by minimizing the crimped portion of the filtering material thereby maximizing the effective filtering area. Another embodiment reduces total weight of filtering material, and thereby costs of manufacture, while still producing high level filtration efficiency by utilizing a "double crimp" thereby forming an enclosed intermediate cavity means so that the smoke must pass through the filtering material twice.

4 Claims, 7 Drawing Figures

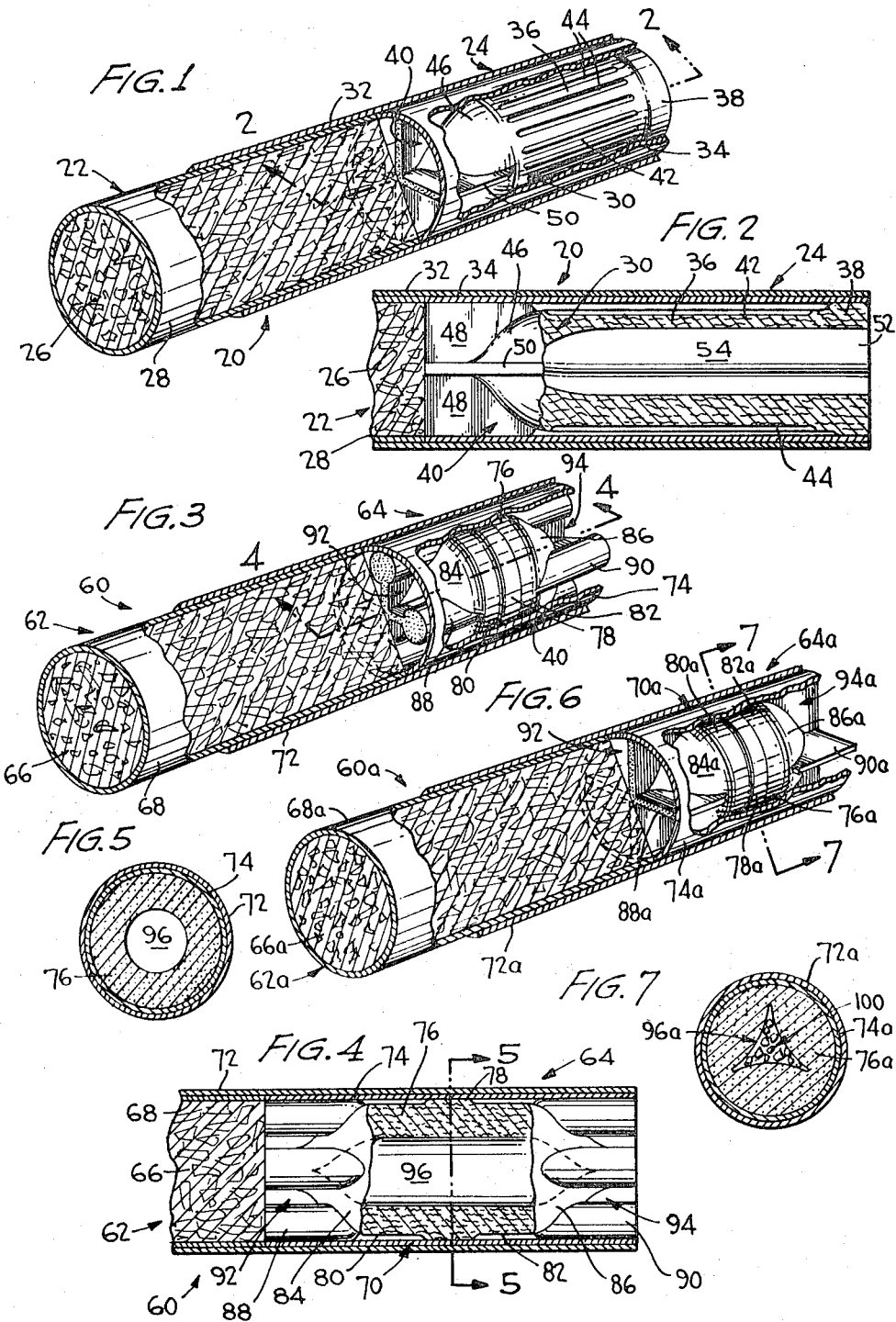

TOBACCO SMOKE FILTER

This is a divisional of application Ser. No. 261,835, filed June 12, 1972 which is a continuation-in-part of co-pending application Ser. No. 155,705, filed June 23, 1971, which in turn is a division of prior application Ser. No. 45,109, filed June 10, 1970, now U.S. Pat. No. 3,637,447, which in turn is a continuation-in-part of application Ser. No. 820,355, filed Apr. 30, 1969, now U.S. Pat. No. 3,599,646, which in turn is a continuation-in-part of application Ser. No. 727,477, filed May 8, 1968, now U.S. Pat. No. 3,533,416.

SUMMARY OF THE INVENTION

The invention relates to the production of filter means and relates more particularly to tobacco smoke filter elements. More specifically, the instant inventive concepts are primarily concerned with producing filter means for cigarettes, although the products of this invention are generally useful as filters, particularly for tobacco smoking means, whether they be cigarettes, cigars, pipes, or the like. Since filters for cigarettes are particularly commercially important, the basic embodiments of the instant invention will be discussed as they relate to the production of filtered cigarettes.

Various prior art techniques are known for making filters for use in connection with cigarettes, and the like, although the resulting products, in general, have one or more disadvantages. Perhaps the most important property of a filter means is its efficiency, that is, its ability to remove undesirable constituents from tobacco smoke. Filtration efficiency is ordinarily measured in terms of the percentage of total particulate matter (TPM) removed from the smoke, although there is also some concern for the percentage of gas phase constituents which a filter means is capable of removing. While filtration efficiency is perhaps the most important property of cigarette filter means, it has been necessary, with prior art filter devices, to compromise the filtration efficiency in order to provide such filters with other properties, such as pressure drop, taste, hardness, appearance and cost, which are important from the standpoint of commercial acceptability. For example, the most commonly utilized cellulose acetate filter means has a relatively low filtration efficiency since increased efficiency can only be obtained either by increasing the density of the filter material or the length of the filter element, both of which produce a pressure drop across the filter which is excessive and unacceptable from a commercial standpoint. While various suggestions have been made for the production of filter means which have improved filtering properties, such prior art developments have not become commercial either because the resultant filter means have been found to have objectionable "taste" characteristics whereby cigarettes provided with such filtering means fail to satisfy a large segment of the smoking public, or because the techniques and/or the materials utilized in the production of such filter means have increased the cost excessively.

High filtration efficiency is considered by the industry to be removal of 60 percent or more of total particulate matter. Cigarette filters having such properties are presently being produced in accordance with the teachings of U.S. Pats. Nos. 3,533,416, 3,599,646, 3,637,447, and 3,648,711. Yet, the production of a cigarette filter, having even a slightly increased filtration efficiency, without detrimentally affecting other desirable properties, such as pressure drop and the like, would be commercially important. Moreover, the production of a cigarette filter or the like having high filtration efficiency, but utilizing substantially less material, thereby minimizing the costs of manufacturing, would also be quite commercially important.

Therefore, it is one important object of the instant inventive concepts to provide a cigarette filter means or the like having improved filtration efficiency, without undesirably affecting other important commercial requirements, particularly pressure drop.

Another basic object of this invention, is the provision of a cigarette filter means requiring substantially less material, thereby being significantly less expensive to manufacture, while still maintaining product characteristics at an acceptable level.

Another object of this invention, is the provision of a filter means of the type described, which, in addition to having high total particulate matter filtration efficiency, can be readily modified to provide high gas phase filtration efficiency without adversely affecting the pressure drop, "taste," hardness, appearance or cost. Specifically, a filter means according to this feature can be produced which includes a sorbent filtering material in particulate form having excellent gas or vapor phase filtration characteristics, such as, for example, activated carbon or the like.

Yet, a further feature of the instant inventive concepts is the provision of filter means having the foregoing characteristics which can be manufactured at high speed and at relatively low cost, utilizing the basic techniques described in the aforementioned U.S. Patents, the disclosures of which are incorporated herein by reference, with such filter means including self-centering characteristics so as to further simplify the manufacturing procedures and operations.

Other objects of the instant inventive concepts will either be specifically set forth hereinafter, or will be obvious to those skilled in the art.

DESCRIPTION OF THE PREFERRED EMBODIMENTS

Preferred embodiments of the instant inventive concepts will now be described with reference to the accompanying drawing wherein:

FIG. 1 is a fragmentary perspective view of a portion of a filtered cigarette incorporating a filter element according to one embodiment of the instant inventive concepts, parts being broken away and in section for illustrative clarity;

FIG. 2 is a fragmentary longitudinal cross-sectional view taken substantially on lines 2—2;

FIG. 3 is a fragmentary perspective view of a portion of a filtered cigarette incorporating a filter element according to a different embodiment of the instant inventive concepts, parts being broken away and in section for illustrative clarity;

FIG. 4 is a fragmentary logitudinal cross-sectional view taken substantially along lines 4—4 of FIG. 3;

FIG. 5 is a transverse cross-sectional view taken substantially along lines 5—5 of FIG. 4;

FIG. 6 is a fragmentary perspective view of a portion of a filtered cigarette incorporating a modified filter element according to the instant inventive concepts and similar to the embodiment of FIGS. 3—5; and FIG. 7 is a transverse cross-sectional view taken substantially along lines 7—7 of FIG. 6.

Like reference characters refer to like parts throughout the several views of the drawing.

Referring now to the drawing in general, and more particularly to FIGS. 1 and 2, a portion of a filtered cigarette is designated generally by the reference numeral 20 and comprises basically a tobacco portion 22 and a filter portion 24. The tobacco portion 22 comprises, as usual, a rod of tobacco 26 overwrapped with paper or the like 28.

The filter portion 24, in the embodiment shown in FIGS. 1 and 2, comprises one form of filter element according to the instant inventive concepts, designated generally by the reference numeral 30, and secured in end-to-end relationship with one end of the tobacco portion 22 as by a tipping overwrap 32. As will be pointed out hereinafter, this particular form of filter element, for a given pressure drop, provides an increased filtration efficiency on the order of 3 to 4 percent.

The filter element 30 includes basically an axially elongated hollow, outer-member 34 and an axially elongated, hollow, inner-member disposed within the outer-member 34.

The outer-member 34 may be a cylinder of ordinary "plug" wrap as is conventially used in the manufacture of filter elements for cigarettes, although, this member may be formed of plastic of other materials, if desired.

The inner-member 36 comprises what may be called a "tube" formed primarily of one or a combination of various filtering media such as, for example, continuous filamentary tow formed of plasticized cellulose acetate or the like or staple fiber or other suitable materials.

The preferred techniques for manufacturing a filter element according to the instant inventive concepts, are shown for example, in U.S. Pats. Nos. 3,637,477, and 3,648,711, although other techniques may be utilized, if desired.

At one end portion of the inner-member 36 an integral "hump" is provided as shown at 38, the peripheral portions of which are juxtaposed to portions of the inner surface of the outer-member 34 to at least substantially preclude axial passage of smoke across the area therebetween. Any desired adhesive means (not shown) may be included in this area to provide a smoke-tight seal, although the outer-member 34 may merely be overwrapped about the inner-member 36 to provide a substantially smoke-tight seal in this area. The important characteristic of this area is that smoke will pass through portions of the filtering material of the inner-member 36 before bypassing the inner-member across this area.

The axial extent of the peripheral portions 38 is quite limited, encompassing no more than for example, 5mm. of a filter element totalling 25mm. This permits the maximum utilization of the filtering material for its primary function, that is, filtration of smoke passing therethrough. The major portions of the outer surface of the inner-member 36 are spaced from the inner surface of the outer-member 34 to define first elongated, high surface area, cavity means 40 therebetween. Specifically, this first cavity means 40 includes the space surrounding an offset portion 42 of the inner-member 24, which is generally cylindrical and of slightly smaller external diameter than the hump 38. Further, the first cavity means 40 includes the space surrounding the end portion of the inner-member 36 juxtaposed to the tobacco rod 26 as will be explained in more detail hereinafter. A multiplicity of elongated channels 44 may be provided in the outer surface of the offset portions 42 in order to insure that smoke may enter this area in the event that the offset portions 42, due to manufacturing tolerances, are in sufficiency spaced from the inner surface of the outer-member 34.

Integral portions of the inner-member 36 extending across the interior thereof in a juxtaposition to the tobacco rod 26 are crimped or otherwise sealed as shown in the aforementioned U.S. Patents to produce an area which offers at least as much resistance to passage of smoke as the filtering material. In other words, this end portion of the inner-member 36 is closed so that smoke entering from the tobacco rod 36 must pass from the first cavity means 40 through the filtering material before exiting from the mouthpiece end of the filter element 30.

This crimped area includes integral tapered portions 46 of the inner-member which extend outwardly from the end portion of the inner-member 36 juxtaposed to the tobacco rod 26 toward the inner surface of the outer-member 34, preferably flowing smoothly into the offset portions 42. Moreover, axially extending circumferentially spaced, integral fin means 48 surround the tapered portions 46 of the inner-member 36 and include axially extending edge portions 50 juxtaposed to the inner surface of the outer-member 34 so as to center the inner-member 36 within the outer-member 34. The fin means 48 extend axially from the end portion of the inner-member 36 juxtaposed to the tobacco rod 26 over substantially the full axial extent of the tapered portions 46 of the inner-member 36.

Second portions 52 of the inner-member 36 define a second area extending across the interior of the inner-member 36 which offers less resistance to passage of smoke than the sealed area at 38. In the embodiment shown, these second portions 52 may merely be the inner surface of the end portion of the inner-member 36 at the mouthpiece end of the filter element 30 which define an opening. A second elongated cavity means 54 is defined interiorly of the inner-member 36.

If desired, the "second portions" of the inner-member 36 may include a solid plug or disc (not shown) so as to close the mouthpiece end of the inner-member 36 enabling the incorporation of an additional smoke modifying material (also not shown) in the second cavity means 54. In any event, it is important that the smoke from the tobacco rod 26 must pass from the first cavity means 40 through the filtering material of the inner-member 36 into the second cavity means 54 and then to the smoker through the "second portions" 52.

The configuration of the inner-member 36 may vary substantially, several modifications thereof, being shown in the aforementioned U.S. Patents. For example, the fin means 48 may be generally cruciform-shaped as shown in the embodiments of FIGS. 1 and 2 or, alternatively, may be generally S-shaped or Y-shaped as shown in several of the afore-mentioned U.S. Patents. Similarly, the cross-sectional shape of the second cavity means 54 may be circular as shown in FIG. 2, or alternatively may have some other shape, such as the triangular shape shown, for example, in the embodiment of FIG. 7. Such modifications may be readily accomplished by those skilled in the art by merely modifying the configuration of the crimping wheels for forming the fin means 48 or the mandrel utilized for forming the second cavity means 54.

An important feature of the embodiment of FIGS. 1 and 2 is the increased filtration efficiency realized by minimizing the axial extent of the crimped end portion juxtaposed to the tobacco rod 26. It will be recognized that two sections of the filtering material of which the inner-member 36 is formed are not capable of performing their primary function, that is, filtration of total particulate material from the smoke passing through the inner-member. These sections comprise the sealed peripheral portions 38 and the crimped portions at the opposite end of the inner-member 36 which close the second cavity means 54 and which form the fin means 48. The peripheral portions 38 can be limited only to a particular extent without detrimentally affecting the seal that must be formed between the outer surface of the inner-member 36 and the inner surface of the outer-member 34. It has now been found that the crimped end portion of the inner-member 36 can also be minimized substantially beyond that shown in the prior U.S. Patents, thereby maximizing the useful area of filtering material without detrimentally affect the other characteristics of the filter element 30. The length of the fin means, which extend from the end portion of the inner-member 36 juxtaposed to the tobacco rod 26 over substantially the full length of the tapered portions 46 of the inner-member 36 will be seen to comprise about 25 percent of the total axial length of the inner-member 36 in the embodiment shown in FIGS. 1 and 2. Such a design is capable of increasing the filtration efficiency by approximately 3 to 4 percent, without significantly modifying pressure drop characteristics, as compared to a filter element of the type shown in the aforementioned U.S. Patents wherein the axial length of the fin means comprises on the order of two-thirds of the overall length of the inner-member. Specifically, a filter means of the type shown in FIGS. 1 and 2, formed of continuous cellulose acetate filamentary tow and having a pressure drop of approximately 2.8 inches of water has a filtration efficiency on the order 73 to 74 percent in comparison to a similar element, even wherein the axial extent of the fin means, relative to the overall length of the filter element, is only approximately 50 percent, having a similar pressure drop, resulting in a filtration efficiency ranging from about 69 percent to less than 71 percent. This level of increase in filtration efficiency, without detrimentally affecting other characteristics of the filter element, is commercially significant.

Although optimum characteristics can be produced with a filter element having fin means extending over approximately 25 percent of the total length of the filter element, acceptable properties, and self-centering characteristics, can be produced with a filter element wherein the fin means extends from about 5 to about 25 percent of the total length of the inner-member.

Reference is now made to the embodiments of FIGS. 3-7 for a modified form of filter means according to the instant inventive concepts which is capable of producing high filtration efficiency, as that term is defined herein above, while substantially reducing the overall weight of a filter means, thereby minimizing the cost of production. A filter means according to these embodiments may be generally termed a "double crimped" filter means and may be formed according to the techniques and with the apparatus disclosed in the aforementioned U.S. Patents. In the embodiments of FIGS. 3-5, a filtered cigarette comprising a "double crimped" filter means is designated generally by the reference number 60. The filtered cigarette 60 includes a tobacco portion 62 and a filter portion 64, the tobacco portion comprising a rod of tobacco 66 overwrapped with paper or the like 68, as usual.

The filter portion 64 comprises a filter element 70 secured in end-to-end relationship with one end of the tobacco portion 62 as by a tipping overwrap 72. Again, as in the previous embodiment, the filter element 70, includes an axially elongated, hollow, outer-member 74 and an axially elongated, hollow, inner-member 76, disposed within the outer member.

The inner-member 76, in this embodiment, includes integral peripheral portions 78 intermediate its end portions which are juxtaposed to the inner surface of the outer member 76 to at least substantially preclude axial passage of smoke across the area therebetween, this area being "sealed" either with or without an adhesive means, as described with respect to the previous embodiment. Offset portions 80, 82 may be provided on either side of the "hump" 78 or, alternatively, the intermediate portions of the inner-member 70 may be totally sealed to the inner surface of the outer-member 74. In any event, the opposite end portions of the inner-member 76 are crimped or closed to form integral tapered portions 84, 86 and, if desired, integral rib means 88, 90.

With this embodiment it will be seen that two elongated end cavity means 92, 94 are defined between the outer surface of the inner-member 76 and the inner surface of the outer-member 74. Moreover, an enclosed intermediate cavity means 96 is formed interiorly of the inner-member 76.

Thus, smoke from the tobacco rod 66 must pass first through the end cavity means 92, then through the filtering material of the inner member 76, then through the intermediate cavity means 96, then again through the filtering material of the inner-member 76 and into the other end cavity means 94 before reaching the smoker. This double passage of the smoke through the filtering material and the tortuous paths set up increases the filtration efficiency so that, with substantially less filtering material, high levels of total particulate matter can still be effectively removed.

For example, for a filter element of the type shown in FIGS. 3-5 having a length of 25mm. a filtration efficiency on the order of 65 percent with a pressure drop of 2.8 inches of water can be realized utilizing only 1.34 grams per 100 mm. rod. In comparison, a weight of approximately 1.65 grams per 100mm. rod is required to produce a 25mm. filter element having the same pressure drop and a filtration efficiency of approximately 69 percent. In fact, it is believed that the filtration efficiency of the "double crimp" elements can be increased to approximately the level of a "single crimp" filter while still utilizing substantially less material. The foregoing figures show a reduction in total weight of from 15 to 20% while still producing a filter element capable of removing a high level of total particulate matter.

The embodiment of FIGS. 3-5 will be seen to have an intermediate cavity means 96 of generally circular cross section and fin means 88 of what may be called "planet cross" design. It is to be understood that these configurations are merely illustrative and that various modifications thereto can be made without departing from the instant inventive concepts. For example, reference is made to the embodiment of FIGS. 6 and 7 wherein parts similar to the embodiment of FIGS. 3–5 are designated by the same reference number followed by the suffix "a." In this embodiment, it will be seen that the cross-sectional shape of the intermediate cavity means 96a is generally triangular whereas the fin means 88a are of a cruciform shape as in the embodiment of FIGS. 1 and 2.

Moreover, in the embodiment of FIGS. 6 and 7, a quantity of a sorbent smoke-modifying material such as activated carbon or the like, is shown at 100 to illustrate the fact that, if desired, this cavity may be filled with a smoke-modifying material in order to provide improved gas phase filtration efficiency or other special effects. The smoke-modifying material 100 may be loose granular particles or, if desired, may be "bonded" in the manner described in the aforementioned U.S. Patents.

From the foregoing detailed description, it is believed that those skilled in the art will recognize the important commercial aspects of the various embodiments of the improved filter means according to the instant inventive concepts. Thus, the embodiment of FIGS. 1 and 2 is capable of providing improved filtration efficiency while maintaining the level of other commercial desirable properties such as pressure drop, "taste," hardness, appearance and cost. The embodiments of FIGS. 3–7 are capable of producing high level filtration efficiency, while significantly reducing the cost and otherwise maintaining the commercially significant characteristics mentioned hereinbefore.

The embodiments of the invention in which an exclusive property or privilege is claimed are defined as follows:

1. A filter means including a filter element comprising:
   a. an axially elongated, hollow, outer member;
   b. an axially elongated, hollow, inner member disposed within said outer member;
   c. said outer member including an inner surface and an outer surface and having spaced end portions;
   d. said inner member comprising a filtering material and including an inner surface and an outer surface and having spaced end portions;
   e. integral peripheral portions of said outer surface of said inner member in juxtaposition to one end portion of said inner member being juxtaposed to portions of said inner surface of said outer member to at least substantially preclude axial passage of smoke across the area therebetween;
   f. the major portions of said outer surface of said inner member being spaced from said inner surface of said outer member to define first elongated cavity means therebetween;
   g. integral first portions of said inner member defining a first area extending across the interior of said inner member in juxtaposition to the other end portion of said inner member which offers at least as much resistance to passage of smoke as said filtering material;
   h. integral tapered portions of said inner member extending outwardly from said other end portion of said inner member toward said inner surface of said outer member;
   i. axially extending, circumferentially spaced, integral fin means surrounding said tapered portions of said inner member and including axially extending edge portions juxtaposed to said inner surface of said outer member, said fin means extending axially from said other end portion of said inner member over substantially the full axial extent of said tapered portions of said inner member;
   j. second portions of said inner member in juxtaposition to said one end portion of said inner member defining a second area extending across the interior of said inner member which offers less resistance to passage of smoke than the area between said peripheral portions of said inner member and said inner surface of said outer member;
   k. the interior of said inner member between said first and second portions defining second elongated cavity means, whereby smoke passing through said filter element between opposite ends thereof must travel through both said cavity means and through said filtering material; and
   l. the axial length of said fin means being from about 5 to about 25 percent of the total axial length of said inner member.

2. A cigarette comprising, in combination, a tobacco rod and a filter means secured in end-to-end relationship to one end of said tobacco rod, said filter means including a filter element as defined in claim 1.

3. A filter means according to claim 1 wherein said filtering material comprises cellulose acetate.

4. The filter means of claim 1 wherein said inner member is tubular, the outer surface of one end portion of said inner member defining said peripheral portions, the other end portions of said inner member being crimped and sealed together to define said first area, spaced parts of the periphery of said crimped portions defining said fin means and contacting said inner surface of said outer member to assist in centering said inner member within said outer member, the inner surface of said one end portion of said inner member being open to define said second area.

* * * * *